(12) United States Patent
Clark

(10) Patent No.: US 7,249,736 B2
(45) Date of Patent: Jul. 31, 2007

(54) PROCESS FOR LANDING A TAILLESS AIRCRAFT

(75) Inventor: Walter Dennis Clark, Fulerton, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 67 days.

(21) Appl. No.: 11/165,018

(22) Filed: Jun. 23, 2005

(65) Prior Publication Data

US 2007/0145185 A1    Jun. 28, 2007

(51) Int. Cl.
*B64C 25/62* (2006.01)
*B64C 39/10* (2006.01)

(52) U.S. Cl. .................. 244/100 R; 244/36; 244/102 R

(58) Field of Classification Search .................. 244/10, 244/36, 100 R, 104 FP, 110 D, 110 H, 102 R See application file for complete search history.

(56) References Cited

U.S. PATENT DOCUMENTS

| 2,138,326 A | * | 11/1938 | Pouit ...................... 244/110 D |
| 2,448,064 A | * | 8/1948 | Wallace ................... 244/102 R |
| 2,565,007 A | * | 8/1951 | Van Zelm et al. ....... 244/102 R |
| 2,579,180 A | * | 12/1951 | Eldred .................... 244/104 FP |
| 3,826,450 A | * | 7/1974 | Currey et al. ........... 244/103 R |
| 4,787,486 A | | 11/1988 | Hrusch et al. .............. 188/289 |
| 4,869,444 A | * | 9/1989 | Ralph .................... 244/104 FP |
| 7,143,975 B2 | * | 12/2006 | Udall ..................... 244/102 R |

\* cited by examiner

*Primary Examiner*—Robert P. Swiatek
(74) *Attorney, Agent, or Firm*—Stetina Brunda Garred & Brucker

(57) ABSTRACT

A process for landing a tailless aircraft having a nose, wings that produce lift, a nose landing gear with a shock strut, and main landing gear, comprises the steps of allowing the nose landing gear shock strut to compress after touchdown to a point where the nose of the aircraft has lowered sufficiently to reduce the lift of the wings. The process further includes the step of controlling the rate of rebound of the nose landing gear shock strut such that the nose of the aircraft remains lowered in order to prevent the aircraft from becoming airborne after touchdown.

10 Claims, 2 Drawing Sheets

PROCESS FOR LANDING A TAILLESS AIRCRAFT

BACKGROUND OF THE INVENTION

1. Field of the Invention

The invention relates to the field of aircraft and, in particular, to a process for landing an unmanned tailless or flying wing type aircraft.

2. Description of Related Art

Flying wing or tailless aircraft have a particularly unique problem. They have a very small pitch moment, which makes raising the nose off the ground difficult. Tricycle landing gear are positioned such that the most aft center of gravity (CG) position is still forward of the main landing gear. With a normal aircraft the tail has sufficient leverage to lift the CG about the pivot point of the main landing gear for all CG positions. The solution for a tailless airplane is to rig the landing gear so the airplane rolls along on the ground with a positive angle of attack. However, when a flying wing aircraft is rigged this way and lands badly there is a problem. The aircraft can bounce back into the air. If the aircraft is about to stall, the bounce may put it too high to survive the stall. Conventional aircraft do not suffer from this problem because at touchdown and rotation, the wings have a slight negative lift angle.

Thus, it is a primary object of the invention to provide a process to eliminate a flying wing type aircraft upon landing from returning to the air after touchdown.

It is a further object of the invention to provide a process to eliminate a flying wing type aircraft upon landing from returning to the air after touchdown by insuring that the aircraft has insufficient aerodynamic lift after touchdown to return to the air.

SUMMARY OF THE INVENTION

The invention is a process for landing a flying wing type aircraft having a nose landing gear, main landing gear, and wings that produce lift. The process includes the step of lowering the nose of the aircraft upon touchdown such that lift from the wings is reduced, preferably until a speed below the stall speed of aircraft is reached. This is accomplished by allowing the nose shock strut and main landing gear struts to compress upon touchdown and controlling the rate of rebound, such that the nose of the aircraft remains lowered to a point wherein the lift is reduced until the speed of the aircraft is below the stall speed. Preferably, the lift is reduced to a negative value.

The novel features which are believed to be characteristic of the invention, both as to its organization and method of operation, together with further objects and advantages thereof, will be better understood from the following description in connection with the accompanying drawings in which the presently preferred embodiments of the invention are illustrated by way of examples. It is to be expressly understood, however, that the drawings are for purposes of illustration and description only and are not intended as a definition of the limits of the invention.

DESCRIPTION OF THE PREFERRED EMBODIMENT

Figure 1:
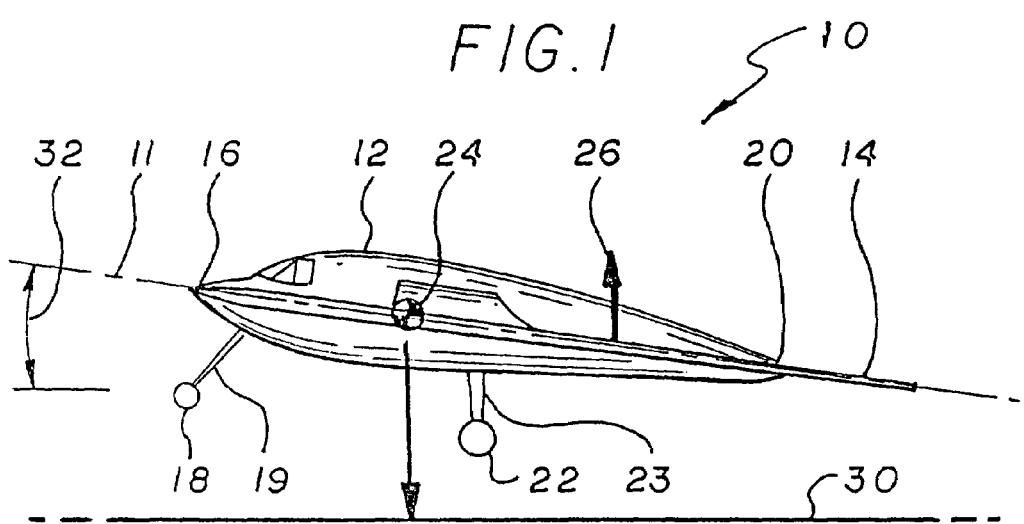
FIG. 1 is a side view of a flying wing aircraft approaching the runway with the nose gear landing gear fully extended.

Referring to FIG. 1, the tailless or flying wing aircraft, generally indicated by numeral 10, includes a center fuselage section 12 having a longitudinal axis 11, wing 14, and a nose 16 with an extended nose landing gear 18 having a shock strut 19, tail 20, and extended main landing gear 22 with shock struts 23. The CG of the aircraft, indicated by numeral 24, lies between the nose 16 and main landing gear 22. The aircraft 10 is shown at a point just prior to landing on the runway 30 at an angle of attack, indicated by numeral 32.

The shock strut 23 of the main landing gear struts 22 are the key to the invention. The nose landing gear strut 19 is designed to have a shock return time greater than the shock struts 23. How this is accomplished will be subsequently discussed.

Figure 2:
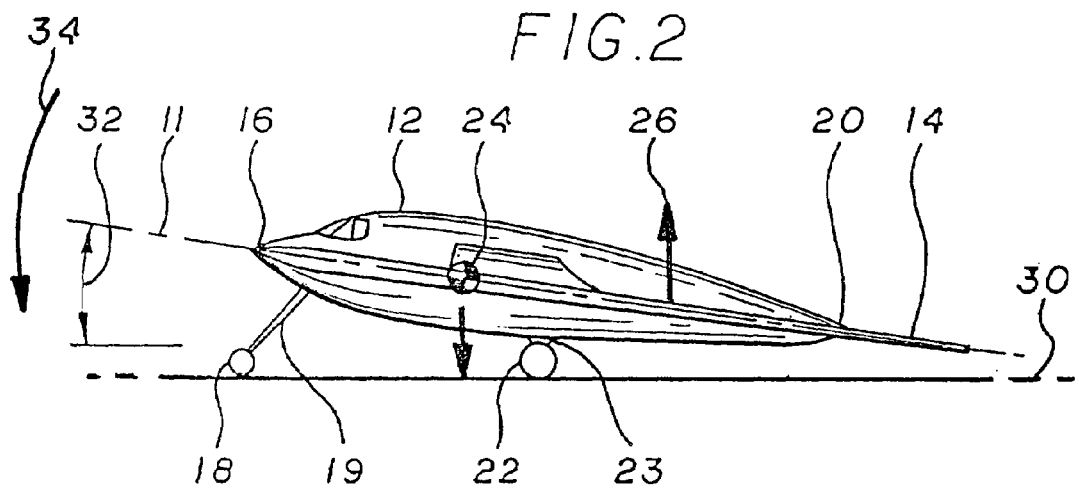
FIG. 2 is a view of the aircraft shown in FIG. 1 having just touched down on the runway, compressing the struts the main landing gear, while the nose landing gear is just beginning to compress.
Figure 3:
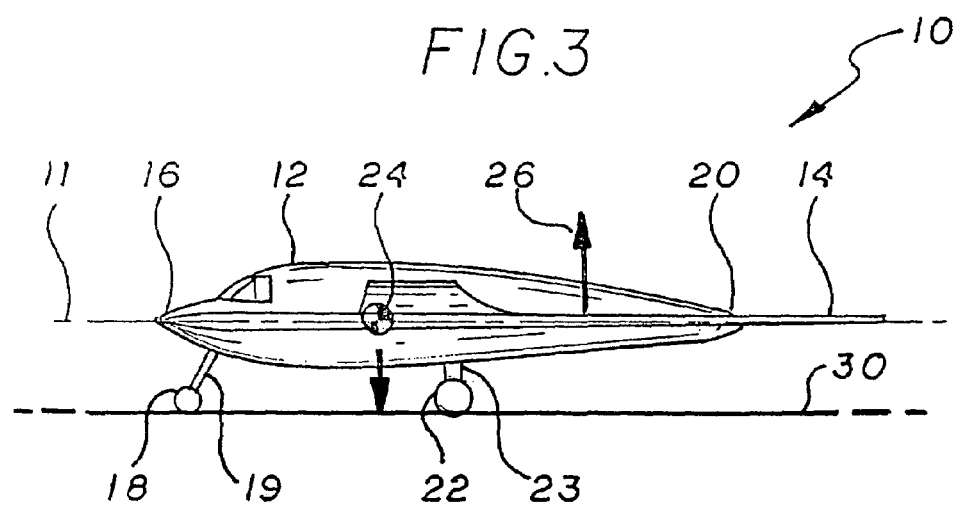
FIG. 3 is a is a view of the aircraft shown in FIG. 1 with the aircraft nose gear shock strut and main landing shock struts are fully compressed.
Figure 4:
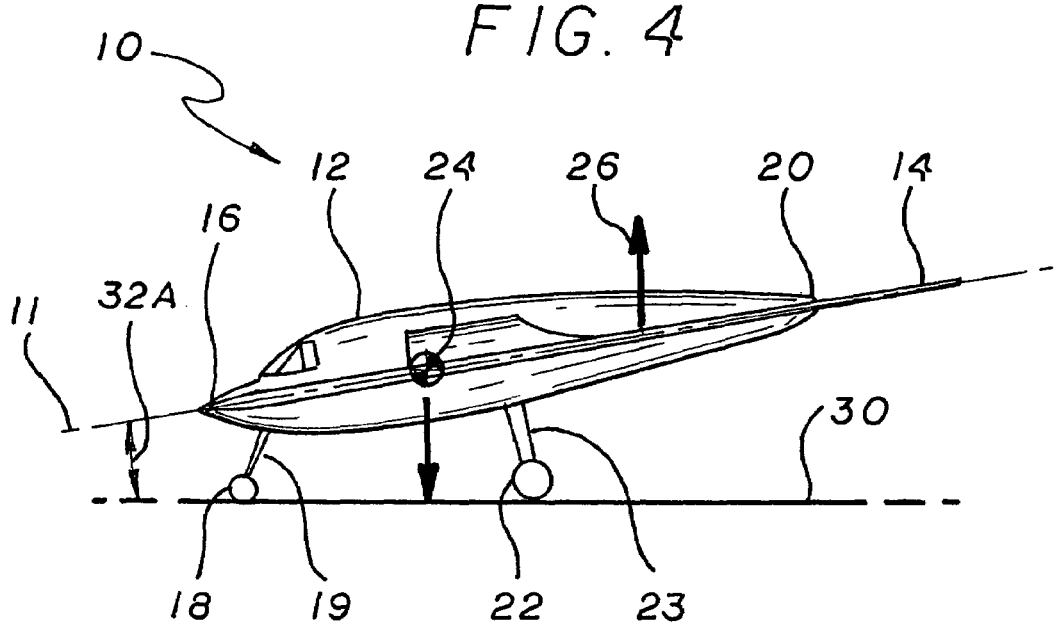
FIG. 4 is a view of the aircraft shown in FIG. 1 wherein the nose gear is still compressed and the main landing gear has rebounded to a partially extended position.
Figure 5:
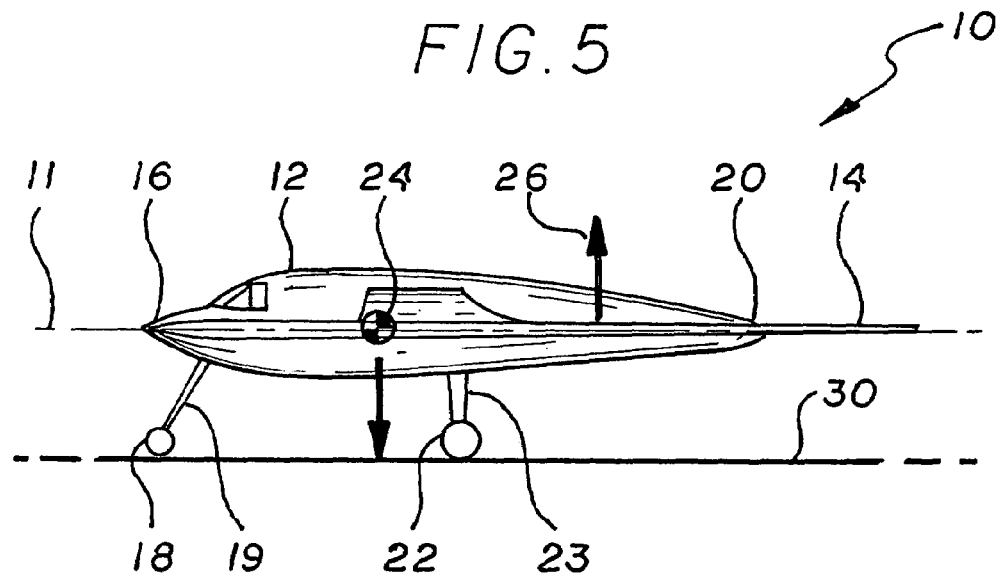
FIG. 5 is a view of the aircraft shown in FIG. 1 with the nose gear shock strut having finally returned to a partially extended position.

In FIG. 2, it can be seen that the aircraft 10 has impacted the runway 30 and compressed the main landing gears 22. The angle of attack 32 is initially the same as show in FIG. 1, but the landing gears are now closer to the wing as they absorb the shock of landing. In FIG. 3, it can be seen that both the nose landing gear 18 and main landing gears 22 have fully compressed and the aircraft is now level. In FIG. 4 the quicker acting main gear 22 shocks 23 have allowed the back of the airplane to return to their normal position, but the nose landing gear 18 shock strut 19 with its extra long time constant stays compressed longer and thus keeps the wing 14 in a negative angle of attack 32A. This holds the aircraft pressed against the ground while it slows down. In FIG. 5, the nose landing gear 18 shock strut 19 has finally come to its normal length, after the aircraft 10 speed is below the stall speed.

There are numerous shock struts that can differentially control the upstroke and rebound rates. For example U.S. Pat. No. 4,787,486 Landing Gear Mechanism Including Controlled Instroke And Rebound Damping And Stroke Overload Protection by L. C Hrusch, herein incorporated by reference. This invention uses a first metered orifice for controlling the upstroke and second orifice to control the rebound. This device with properly sized orifices could be used in this process and system.

While the invention has been described with reference to particular embodiments, it should be understood that the embodiments are merely illustrative as there are numerous variations and modifications, which may be made by those skilled in the art. Thus, the invention is to be construed as being limited only by the spirit and scope of the appended claims.

INDUSTRIAL APPLICABILITY

The invention has applicability to the aircraft manufacturing industry.

The invention claimed is:

1. A process for landing a tailless aircraft having a nose, wings that produce lift, a nose landing gear with a shock strut, and main landing gear, the process comprising the steps of:

allowing the nose landing gear shock strut to compress after touchdown to a point where the nose of the aircraft has lowered sufficiently to reduce the lift of the wings; and controlling the rate of rebound of the nose landing gear shock strut relative to the rate of rebound of said main landing gear such that the nose of the aircraft remains lowered.

2. The process as set forth in claim 1 wherein the rate of rebound of the nose landing gear shock strut is controlled such that the nose of the aircraft remains lowered until the speed of the aircraft is below the stall speed.

3. The process as set forth in claim 2 wherein the rate of rebound of the nose landing gear shock strut is controlled by metering fluid flow within the shock strut.

4. The process as set forth in claim 1 wherein the nose landing gear shock strut is allowed to compress until the lift from the wings is reduced to a negative value.

5. A process for landing a tailless aircraft having a nose, wings adapted to produce lift, and a tricycle landing gear comprising main landing gear and a nose landing gear located forward of the main landing gear, the main and nose landing gear including shock struts, the aircraft being oriented at an angle of attack just prior to touchdown, the process comprising the steps of:

allowing the main landing gear shock struts to compress such that the aircraft angle of attack after touchdown is generally equal to the aircraft angle of attack just prior to touchdown;

allowing the nose landing gear shock strut to compress such that the aircraft is re-oriented at a reduced angle of attack relative to the angle of attack just prior to touchdown;

allowing the main landing gear shock struts to rebound from a compressed state at a faster rate than the nose landing gear shock strut such that the aircraft maintains the reduced angle of attack; and maintaining the aircraft at the reduced angle of attack until the aircraft speed is less than the aircraft stall speed.

6. The process set forth in claim 5 wherein the nose landing gear shock strut is allowed to compress until the aircraft assumes a negative angle of attack.

7. The process set forth in claim 6 wherein the aircraft is maintained at the negative angle of attack until the aircraft speed is less than the aircraft stall speed.

8. The process set forth in claim 5 wherein the rate of rebound of the nose landing gear shock strut is controlled by metering fluid flow within the shock strut.

9. The process set forth in claim 5 wherein the nose of the aircraft is maintained lower than the rest of the aircraft until the lift from the wings is reduced to a negative value.

10. A process for landing a tailless aircraft having a nose, wings adapted to produce lift, and a tricycle landing gear comprising main landing gear and a nose landing gear located forward of the main landing gear, the main and nose landing gear including shock struts being configured to allow differential control of the upstroke and rebound rates of the shock struts, the aircraft being oriented at an angle of attack just prior to touchdown, the process comprising the steps of:

allowing the shock struts of the main landing gear to compress on the upstroke such that the aircraft angle of attack after touchdown is generally equal to the aircraft angle of attack just prior to touchdown;

allowing the nose landing gear shock strut to compress on the upstroke such that the aircraft is re-oriented at a negative angle of attack relative to the angle of attack just prior to touchdown;

allowing the nose landing gear shock strut to stay compressed longer than the main landing gear shock struts such that the aircraft maintains the negative angle of attack; and controlling the rate of rebound of the nose landing gear shock strut such that the negative angle of attack is maintained until the aircraft speed is less than the aircraft stall speed.

* * * * *